(12) United States Patent
Liu et al.

(10) Patent No.: US 9,614,824 B2
(45) Date of Patent: Apr. 4, 2017

(54) HANDLING OPEN AUTHENTICATION OF AN INVOKED WEB SERVICE IN A PROCESS

(71) Applicant: International Business Machines Corporation, Armonk, NY (US)

(72) Inventors: Jian Min Liu, Beijing (CN); Ying Liu, Beijing (CN); Xi Ning Wang, Beijing (CN); Shao Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 553 days.

(21) Appl. No.: 14/031,519

(22) Filed: Sep. 19, 2013

(65) Prior Publication Data
US 2014/0096224 A1    Apr. 3, 2014

(30) Foreign Application Priority Data

Sep. 29, 2012  (CN) .......................... 2012 1 0372196

(51) Int. Cl.
*H04L 29/06* (2006.01)

(52) U.S. Cl.
CPC .......... *H04L 63/08* (2013.01); *H04L 63/0807* (2013.01)

(58) Field of Classification Search
CPC ............................ H04L 63/08; H04L 63/0807
See application file for complete search history.

(56) References Cited

U.S. PATENT DOCUMENTS

| 7,478,434 | B1 | 1/2009 | Hinton et al. |
| 7,900,247 | B2 | 3/2011 | Chong |
| 8,607,306 | B1 * | 12/2013 | Bridge .................. H04L 63/068 |
| | | | 726/1 |
| 8,800,009 | B1 * | 8/2014 | Beda, III ............ H04L 63/0846 |
| | | | 713/155 |
| 8,966,599 | B1 * | 2/2015 | Barrows ................. H04L 63/08 |
| | | | 705/37 |
| 2001/0027527 | A1 * | 10/2001 | Khidekel ................ G06F 21/32 |
| | | | 726/9 |
| 2006/0015728 | A1 * | 1/2006 | Ballinger ............ H04L 63/0428 |
| | | | 713/172 |

(Continued)

FOREIGN PATENT DOCUMENTS

| CN | 101895555 A | 11/2010 |
| CN | 102394887 A | 3/2012 |
| CN | 102546648 A | 7/2012 |

OTHER PUBLICATIONS

"Using secure services", 'http://maps.six.nsw.gov.au/arcgis/sdk/soap/Using_secure_services.htm', 2009-2010; pp. 1-10.*

(Continued)

*Primary Examiner* — Michael Pyzocha
(74) *Attorney, Agent, or Firm* — Cantor Colburn LLP; Rahan Uddin (57) ABSTRACT

Embodiments relate to methods, systems, and computer program products for handling open authentication (OAuth) of an invoked web service in a process. An aspect includes determining whether an OAuth access token has expired. Another aspect includes initiating an automatic update of the OAuth access token based on determining that the OAuth access token has expired.

17 Claims, 3 Drawing Sheets

(56) References Cited

U.S. PATENT DOCUMENTS

| | | | | |
|---|---|---|---|---|
| 2008/0159318 | A1* | 7/2008 | Pierlot | G06F 21/335 370/412 |
| 2011/0197266 | A1* | 8/2011 | Chu | H04L 9/3228 726/5 |
| 2011/0321131 | A1 | 12/2011 | Austel et al. | |
| 2012/0060210 | A1* | 3/2012 | Baker | H04L 63/0807 726/9 |
| 2012/0102566 | A1 | 4/2012 | Vrancken et al. | |
| 2012/0117626 | A1 | 5/2012 | Yates et al. | |
| 2012/0144202 | A1 | 6/2012 | Counterman | |
| 2012/0151570 | A1* | 6/2012 | Cooppan | H04L 63/0823 726/10 |
| 2012/0159601 | A1* | 6/2012 | Dalzell | G06F 21/335 726/9 |
| 2012/0204221 | A1 | 8/2012 | Llorente et al. | |
| 2012/0226813 | A1* | 9/2012 | Ragusa | G06F 9/5027 709/227 |
| 2013/0024927 | A1* | 1/2013 | Patil | G06F 21/305 726/9 |
| 2013/0086645 | A1* | 4/2013 | Srinivasan | H04L 63/10 726/4 |
| 2013/0097686 | A1* | 4/2013 | Towata | G06F 21/608 726/9 |
| 2014/0026193 | A1* | 1/2014 | Saxman | G06F 21/33 726/4 |

OTHER PUBLICATIONS

Solberg, Andreas, "BestPractice for dealing with OAuth 2.0 Token expiration at the Consumer", 'https://rnd.feide.no/2012/04/19/best-practice-for-dealing-with-oauth-2-0-token-expiration-at-the-consumer/', Apr. 19, 2012, pp. 1-3.*
Atwood, Mark et al., "OAuth Core 1.0", Dec. 4, 2007, pp. 1-14.*
Tom, A. et al. "OAuth Session 1.0 Draft 1", Aug. 21, 2008, pp. 1-6.*
Kristian, John, "OAuth / Problem Reporting", 'http://wiki.oauth.net/w/page/12238543/ProblemReporting', 2010, pp. 1-3.*
Hammer, E. et al., "The OAuth 2.0 Authorization Framework draft-ietf-oauth-v2-28", Jun. 19, 2012, pp. 1-48.*
Tom, Allen et al. "ScalableOAuth" Lasted edited 7 years 11 months ago, retrieved date Jun. 3, 2016, pp. 1-8.*
Sebastian's Pamplets, "The anatomy of a server sided redirect: 301, 302 and 307 illuminated SEO wise", Oct. 9, 2007, pp. 1-36.*
"Refresh the Access Token (get_token)", Yahoo! Developer Network, Mar. 6, 2010, pp. 1-2.*
"OAuth2 flows", API Documentation POKEN, Oct. 16, 2011, pp. 1-6.*
"The OAuth 2.0 Protocol: Bearer Tokens", based on Dec. 18, 2011 IETF draft, pp. 1-3.*
IP.com, "A Mechanism to remove Client Authorization from OAuth Authorization Server," IP.com No. IPCOM000220484D, Aug. 1, 2012, 5 pages.
IP.com, "Advanced Cloud—Clould Instance Opne Authentication (OAuth) Security Mechanism," IP.com No. IPCOM000205927D, Apr. 8, 2011, 5 pages.

* cited by examiner

HANDLING OPEN AUTHENTICATION OF AN INVOKED WEB SERVICE IN A PROCESS

PRIORITY

This application claims priority to Chinese Patent Application No. 201210372196.8, filed 29 Sep. 2012, and all the benefits accruing therefrom under 35 U.S.C. §119, the contents of which in its entirety are herein incorporated by reference.

TECHNICAL FIELD

The present disclosure relates to web services, and more specifically, to handling open authentication (OAuth) of an invoked web service in a process.

BACKGROUND web service, as a manner of implementing Service-Oriented Architecture (SOA), has solved issues such as interoperability, integration and communication among heterogeneous applications because of features such as openness, reusability, loose coupling, and platform independence. However, for a single web service having relatively simple functions, it is difficult to meet the demand of practical applications in a modern enterprise. In order to solve issues of collaboration and integration in internet applications, individual web services need to be combined together to achieve powerful business functions. Web Services Business Process Execution Language (WS-BPEL) is currently a standard process language proposed by the Organization for the Advancement of Structured Information Standards (OASIS) for combining web services that is widely used in web service integration. WS-BPEL specifies a series of issues such as the data that is shared among a set of web services, cooperative partners involved in a business process and roles of these partners in the business process, potential execution order of web service operations and dependencies therebetween, compensation processing, error processing and exception processing of web services, and how a plurality of organizations and services participate in the web services.

Currently, many web services provide an Application Program Interface (API) to allow a third party applications to utilize their data. When the third party application needs to access user's private data, it should be authenticated. Open Authentication (OAuth) is a popular manner of authentication and is employed by many web services. OAuth is an open standard, which enables a user to allow a third party application to access users' private resources stored on a website without providing the third party application with username and password. OAuth allows a user to provide an access token instead of username and password to access data kept at a specific service provider by the user. Each access token authorizes one particular website to access particular resources within a certain period of time, that is, an access token is only valid for a limited period of time. As such, OAuth allows users to authorize a third party application to access their particular resources stored at another service provider without sharing their access permission or all the resources. OAuth is characterized in that a third party application can not directly acquire user's password; rather, the application uses an access token authorized by user to perform access.

Since an access token is only valid for a limited period of time, the token has to be updated if the time length during which a third party application wishes to perform access exceeds this time period. In case that web services invoked in a WS-BPEL process are protected by OAuth, if the access token expires, most of current handling manners update the token by manually logging into a page provided by an OAuth service provider; however, the efficiency of such updating may be low and cannot meet the demand of business process for efficiency. Further, for a WS-BPEL process in runtime environment, once a WS-BPEL application is deployed and is running, an error will occur when invoking a web service if the access token expires. Instances of that process will then terminate since all tasks after that web service cannot be processed. That is, there is no efficient mechanism for handling errors generated by an invoked web service due to expiration of an access token.

SUMMARY

Embodiments relate to methods, systems, and computer program products for handling open authentication (OAuth) of an invoked web service in a process. An aspect includes determining whether an OAuth access token has expired. Another aspect includes initiating an automatic update of the OAuth access token based on determining that the OAuth access token has expired.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments of handling OAuth of an invoked web service in a process are provided. Various embodiments will be described in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of handling OAuth of an invoked web service in a process may be embodied as a system, method or computer program product. Various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, various embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for various embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments are described below with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create module for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
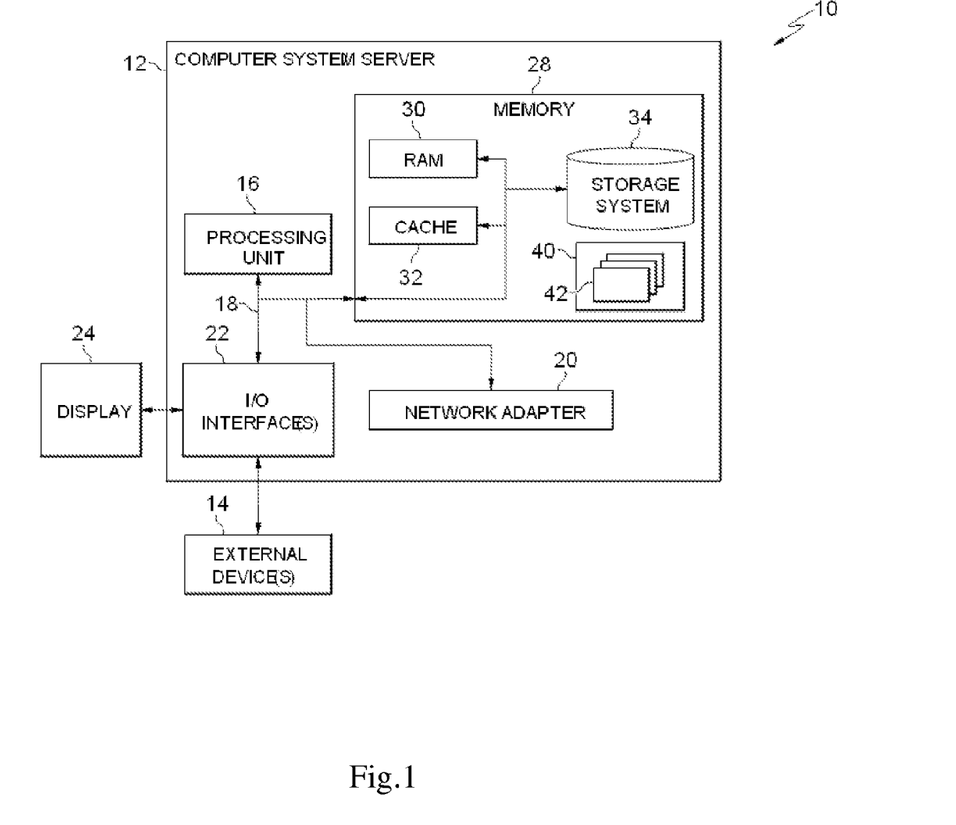
FIG. 1 shows a block diagram of an exemplary computer system/server according to an embodiment.

Referring now to FIG. 1, in which an exemplary computer system/server 12 which is applicable to implement various embodiments of handling OAuth of an invoked web service in a process is shown. Computer system/server 12 is only illustrative and is not intended to suggest any limitation as to the scope of use or functionality of embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk may be provided. In such instances, each can be connected to bus 18 by one or more data media interfaces. As will be further depicted and described below, memory 28 may include at least one program product having a set (e.g., at least one) of program modules that are configured to carry out the functions of various embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, redundant array of independent disks (RAID) systems, tape drives, and data archival storage systems, etc.

Figure 2:
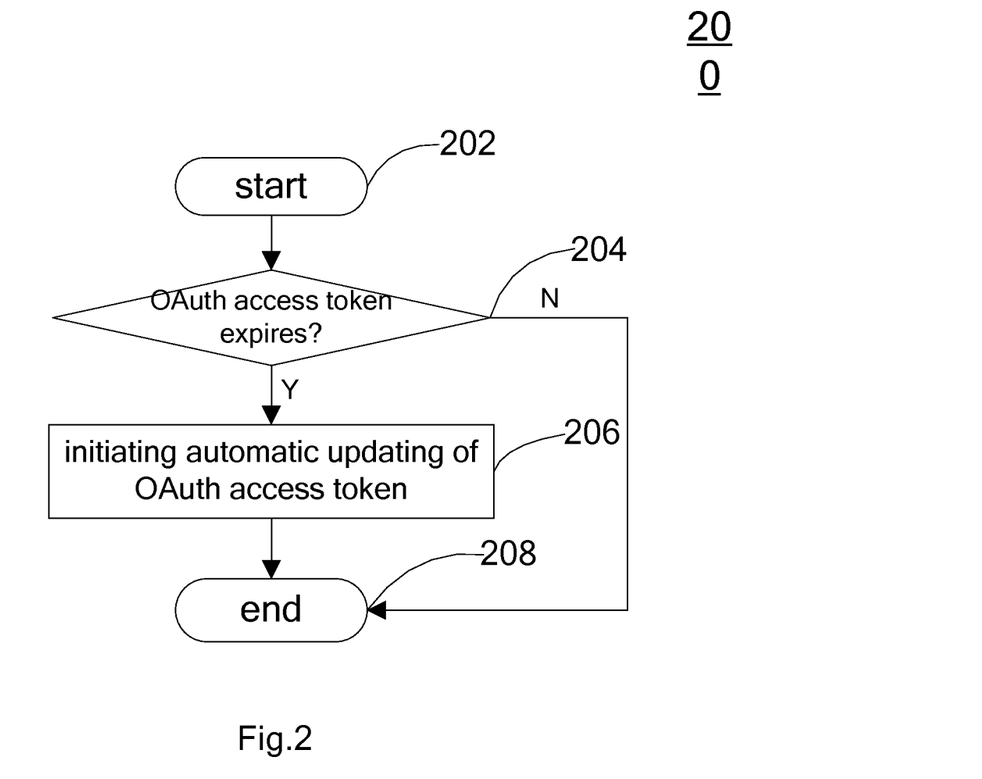
FIG. 2 shows a flowchart of a method for handling OAuth of an invoked web service in a process according to an embodiment.

With reference now to FIG. 2, a flowchart of a method 200 for handling OAuth of an invoked web service in a process according to an embodiment is shown. One or more OAuth-based web services will be invoked during execution of a process. For those OAuth-based web services, there is a need for handling the problem that access token might expire during the OAuth of the invoked web service.

The method 200 for handling OAuth of an invoked web service in a process according to an embodiment starts at block 202, and then, the method 200 proceeds to block 204 of deciding whether an OAuth access token has expired. If the OAuth access token has not expired, i.e. the result of the determination of block 204 is negative, then the method 200 proceeds to block 208 and ends. If the OAuth access token has expired, i.e. the result of the determination of block 204 is positive, then the method 200 proceeds to block 206 and initiates automatic updating of the OAuth access token. It is thereby verified whether an OAuth access token of the web service invoked by the process has expired, and initiating automatic updating of the OAuth access token when the OAuth access token expires, that is, an error generated by the invoked web service due to expiration of the access token is handled efficiently.

According to an embodiment, deciding whether the OAuth access token has expired during block 204 comprises: sending a hypertext transfer protocol (HTTP) request to the invoked web service; and deciding whether the OAuth access token has expired based on the returned result. According to an embodiment, the sending of a HTTP request to the invoked web service comprises: acquiring address of an endpoint corresponding to the invoked web service; constructing address of a description file of the invoked web service with the address of the endpoint; and sending a HTTP request to the address of the description file of the invoked web service, which, according to an embodiment, may be a HTTP GET request. The address of the description file of the invoked web service may be constructed by appending "?wsdl" to the address of the endpoint corresponding to the invoked web service. According to an embodiment, deciding whether the OAuth access token has expired based on the returned result of the HTTP request comprises: checking whether the returned result meets a web service definition language (WSDL) scheme; and determining that the OAuth access token expires if the result does not meet the WSDL scheme.

The method according to one or more embodiments will be described below in conjunction with specific examples. The following is an example of invoking a photo service (PhotoHostingService) in a process, in which the photo service is based on OAuth. For purpose of description, only part of codes is given below.

```
<bpel:process name="MyPhotoPrintingProcess"
targetNamespace="http://sample.bpel.org/bpel/sample"
suppressJoinFailure="yes"
xmlns:tns="http://sample.bpel.org/bpel/sample"
 ... ...
<bpel:invoke name="InvokePhotoHostingService"
partnerLink="PhotoHostingPL"
operation="RetrievePhotosOperation"
portType="ns:PhotoHostingService"
inputVariable="PhotoHostingPLRequest"
outputVariable="PhotoHostingPLResponse">
</bpel:invoke>
 ... ...
        </bpel:process>
```

Relevant content in service description file (i.e., WSDL) corresponding to that photo service is as follows.

```
<?xml version="1.0" encoding="UTF-8"?>
<wsdl:definitions name="PhotoHostingService"
 ... ...
    <wsdl:service name="PhotoHostingService">
        <wsdl:port
binding="tns:PhotoHostingServiceSOAP" name="PhotoHostingServiceSOAP">
            <soap:address location="http://www.example.org/PhotoHostingServiceSOAP"/>
        </wsdl:port>
    </wsdl:service>
 ... ...
</wsdl:definitions>
```

Since the photo service in the process is based on OAuth, the problem that OAuth access token might expire needs to be solved in invoking that photo service. According to an embodiment, it is first decided whether the OAuth access token has expired in block 204. According to an embodiment, a HTTP GET request may be sent to the photo service and whether the OAuth access token has expired may be decided based on the returned result. Specifically, address of an endpoint corresponding to that photo service is first acquired. By analyzing a service description file corresponding to that photo service, address of the endpoint corresponding to that photo service may be acquired, which is:

http://www.example.org/PhotoHostingServiceSOAP

Then, address of the description file of that photo service is constructed by appending "?wsdl" to the address of the endpoint corresponding to that photo service. That is:

http://www.example.org/PhotoHostingServiceSOAP?wsdl

Next, a HTTP GET request is sent to the address of the description file of that photo service and the returned result is acquired.

If the OAuth access token of that photo service has not expired, then the returned result should meet WSDL scheme:

```
<?xml version="1.0" encoding="UTF-8"?>
<wsdl:definitions name="PhotoHostingService"
... ...
    <wsdl:service name="PhotoHostingService">
        <wsdl:port
binding="tns:PhotoHostingServiceSOAP" name="PhotoHostingServiceSOAP">
            <soap:address location="http://www.example.org/PhotoHostingServiceSOAP"/>
        </wsdl:port>
    </wsdl:service>
... ...
</wsdl:definitions>
```

If the OAuth access token of that photo service has expired, then the returned result will not meet WSDL scheme, for example, it may be a segment containing HTML:

```
<divxmlns="http://www.w3.org/1999/xhtml"
class="inner_container">
<div class="title">Application Authorization
<a class="close_button" href="javascript:closeWindow( );"/>
</div>
<div class="content">
    <div class="oauth_intro clearfix">
<div class="oauth_detail">
<p class="oauth_declare">Will authorize
<a title="" href="#0" class="oauth_target">Photo_Printing_Service
</a>to:
</p>
<form method="post" action="authorize" name="authZForm">
<input
type="hidden" value="appondummyphotohosting" name="display"
id="display"/>
<input
type="hidden" value=" submit" id="action" name="action"/>
<input
type="hidden" value="0" id="withOfficalFlag"
name="withOfficalFlag"/>
<input
type="hidden" value="" id="withOfficalAccount"
name="withOfficalAccount"/>
<input type="hidden" value="" id="scope" name="scope"/>
<input type="hidden" value="token" name="response_type"/>
<input
type="hidden"
value="http://apps.dummyphotohosting.com/autobrand"
name="redirect_uri"/>
<input type="hidden" value="2440881916" name="client_id"/>
<input type="hidden" value="null" name="state"/>
<input type="hidden" value=" 1947068170" name="uid"/>
<ul class="oauth_list">
<li class="oauth_list_li">
<i class="icon_user"/>Your personal info, your photos
</li>
</ul>
<!—Authorization-->
<div class="submit_buttons_container clearfix">
<div class="submit_buttons">
<a class="WB_btn_oauth submit_first" onclick="submitForm( );"
href="#"/>
<a class="WB_btn_cancel submit_second" onclick="closeWindow( );"
href="#"/>
</div>
</div>
<!--/Authorization-->
</form>
</div>
</div>
</div>
```

Based on whether the returned result meets WSDL scheme, it may decide whether the OAuth access token of the invoked service (here, photo service) has expired. That is, if the returned result meets the WSDL scheme, then it is determined that the OAuth access token has not expired. If the returned result does not meet the WSDL scheme, then it is determined that the OAuth access token has expired.

According to an embodiment, automatic updating of the OAuth access token as is performed in block 206 comprises: sending a request for updating the OAuth access token to the invoked web service; and receiving an updated OAuth access token. According to an embodiment, sending a request for updating OAuth access token to the invoked web service comprises: sending a HTTP request to the invoked web service; receiving returned result; and constructing the request for updating OAuth access token with the returned result. According to an embodiment, constructing the request for updating OAuth access token with the returned result comprises: extracting content in the returned result related to updating of the OAuth access token; and constructing the request for updating OAuth access token with the extracted content.

The method according to one or more embodiments is described below in conjunction with specific examples. Similarly, the process relates to invoke a photo service (PhotoHostingService), in which the photo service is based on OAuth. According to an embodiment, a request for updating OAuth access token may be sent to that photo service and an updated OAuth access token is received. Specifically, a HTTP request may be sent to that photo service and returned result is received. Based on the above description, if the access token has expired, the returned result will not meet WSDL scheme. Assuming the returned result as described is as follows:

```
<divxmlns="http://www.w3.org/1999/xhtml"
class="inner_container">
... ...
    <!--Authorization-->
    <div class="submit_buttons_container clearfix">
<div class="submit_buttons">
<a class="WB_btn_oauth submit_first" onclick="submitForm( );"
href="#"/>
<a class="WB_btn_cancel submit_second" onclick="closeWindow( );"
href="#"/>
</div>
</div>
<!--/Authorization-->
    ... ...
</div>
```

Content related to updating of the OAuth access token may be extracted by analyzing the returned result and the request for updating OAuth access token may be constructed with the extracted content. It can be seen from the above example that, content in the returned result related to updating of the access token is the following codes:

```
<!--Authorization-->
<div class="submit_buttons_container clearfix">
<div class="submit_buttons">
   <a class="WB_btn_oauth submit_first" onclick="submitForm( );"
   href="#"/>
<a class="WB_btn_cancel submit_second" onclick="closeWindow( );"
href="#"/>
   </div>
</div>
<!--/Authorization-->
```

It is indicated by the above codes that, a request for updating OAuth access token is sent to the photo service by clicking an authorization button. Thus, the request for updating the OAuth access token may be sent to the photo service by inserting a segment of codes to execute an action of clicking an authorization button.

Figure 3:
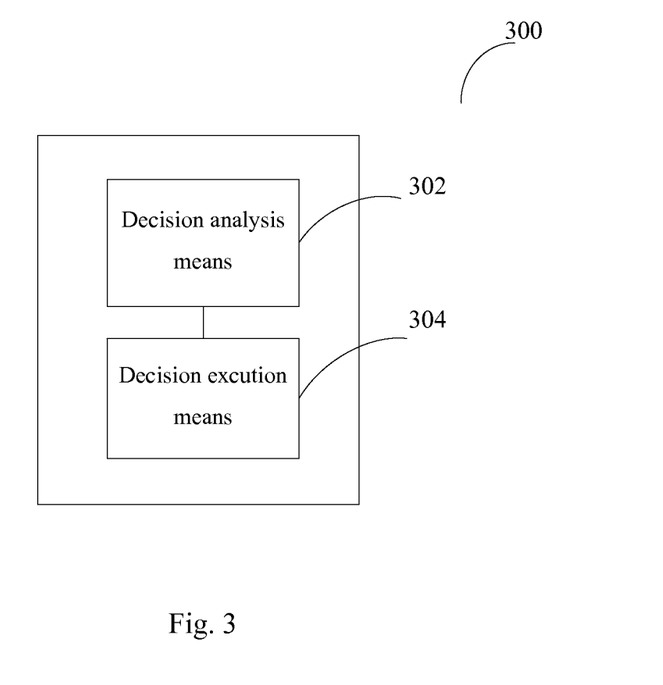
FIG. 3 shows a block diagram of a system for handling OAuth of an invoked web service in a process according to an embodiment.

With reference now to FIG. 3, a block diagram of a system 300 for handling OAuth of an invoked web service in a process according to an embodiment is shown. System 300 may implement method 200 of FIG. 2 as described above. The system 300 for handling OAuth of an invoked web service in a process according to an embodiment comprises: a decision analysis module 302 configured to decide whether an OAuth access token expires; and an initiation module 304 configured to initiate automatic updating of the OAuth access token in response to expiration of the OAuth access token.

According to an embodiment, the decision analysis module 302 further comprises: a requesting module configured to send a HTTP request to the invoked web service; and wherein, the decision analysis module 302 is further configured to decide whether the OAuth access token expires based on the returned result. According to an embodiment, the requesting module further comprises: an acquiring module configured to acquire address of an endpoint corresponding to the invoked web service; a description file address construction module configured to construct address of a description file of the invoked web service with the address of the endpoint; and wherein, the requesting module is further configured to send a HTTP request to the address of the description file of the invoked web service. According to an embodiment, the description file address construction module constructs the address of the description file of the invoked web service by appending "?wsdl" to the address of the endpoint corresponding to the invoked web service. According to an embodiment, the decision analysis module 302 decides whether the OAuth access token expires based on the returned result by: checking whether the returned result meets WSDL scheme; determining that the OAuth access token expires if the result does not meet the WSDL scheme. According to an embodiment, automatic updating of the OAuth access token comprises: sending a request for updating OAuth access token to the invoked web service; and receiving an updated OAuth access token by the initiation module 304. According to an embodiment, sending a request for updating OAuth access token to the invoked web service comprises: sending a HTTP request to the invoked web service; receiving returned result; and constructing the request for updating OAuth access token with the returned result. According to an embodiment, constructing the request for updating OAuth access token with the returned result comprises: extracting content in the returned result related to updating of the OAuth access token; and constructing the request for updating OAuth access token with the extracted content.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for handling open authentication (OAuth) of an invoked web service in a process, comprising:
  determining whether an OAuth access token has expired, the determining comprising:
  sending a hypertext transfer protocol (HTTP) request to the invoked web service; and
  deciding whether the OAuth access token has expired based on a returned result from the invoked web service; and
  initiating an automatic update of the OAuth access token based on determining that the OAuth access token has expired, the initiating including extracting content from the returned result and constructing a request to update the OAuth access token, the extracted content including computer code executable for updating the OAuth access token, and the request to update the OAuth access token including the extracted content.

2. The method according to claim 1, wherein sending a HTTP request to the invoked web service comprises:
  acquiring an address of an endpoint corresponding to the invoked web service;
  constructing an address of a description file of the invoked web service with the address of the endpoint; and
  sending the HTTP request to the address of the description file of the invoked web service.

3. The method according to claim 2, wherein the address of the description file of the invoked web service is constructed by appending "?wsdl" to the address of the endpoint corresponding to the invoked web service.

4. The method according to claim 2, wherein deciding whether the OAuth access token has expired based on the returned result from the invoked web service comprises:
  checking whether the returned result meets a web service definition language (WSDL) scheme;

determining that the OAuth access token has expired if the returned result does not meet the WSDL scheme.

5. The method according to claim 1, wherein the automatic update of the OAuth access token comprises:
   sending the request for updating the OAuth access token to the invoked web service; and
   receiving an updated OAuth access token.

6. The method according to claim 5, wherein sending the request for updating the OAuth access token to the invoked web service comprises:
   sending a HTTP request to the invoked web service;
   receiving a returned result; and
   constructing the request for updating OAuth access token based on the returned result.

7. The method according to claim 6, wherein constructing the request for updating the OAuth access token based on the returned result comprises:
   extracting content from the returned result related to updating of the OAuth access token; and
   constructing the request for updating OAuth access token based on the extracted content.

8. A system for handling OAuth of an invoked web service in a process, the system comprising:
   a memory having computer readable instructions; and
   a processor for executing the computer readable instructions, the computer readable instructions including:
   determining whether an OAuth access token has expired, the determining comprising:
   sending a hypertext transfer protocol (HTTP) request to the invoked web service; and
   deciding whether the OAuth access token has expired based on a returned result from the invoked web service; and
   initiating an automatic update of the OAuth access token based on determining that the OAuth access token has expired, the initiating including extracting content from the returned result and constructing a request to update the OAuth access token, the extracted content including computer code executable for updating the OAuth access token, and the request to update the OAuth access token including the extracted content.

9. The system according to claim 8, wherein the instructions further include:
   acquiring an address of an endpoint corresponding to the invoked web service;
   constructing an address of a description file of the invoked web service with the address of the endpoint; and
   wherein the instructions are further configured to send a HTTP request to the address of the description file of the invoked web service.

10. The system according to claim 9, wherein the construction of the address of the description file of the invoked web service by appending "?wsdl" to the address of the endpoint corresponding to the invoked web service.

11. The system according to claim 9, wherein the deciding determines whether the OAuth access token has expired based on the returned result by:
    checking whether the returned result meets a web service definition language (WSDL) scheme;
    determining that the OAuth access token has expired if the returned result does not meet the WSDL scheme.

12. The system according to claim 8, wherein the automatic update of the OAuth access token comprises:
    sending the request for updating OAuth access token to the invoked web service; and
    receiving an updated OAuth access token from the invoked web service.

13. The system according to claim 12, wherein sending the request for updating the OAuth access token to the invoked web service comprises:
    sending a HTTP request to the invoked web service;
    receiving a returned result; and
    constructing the request for updating OAuth access token based on the returned result.

14. The system according to claim 13, wherein constructing the request for updating the OAuth access token based on the returned result comprises:
    extracting content from the returned result related to updating of the OAuth access token; and
    constructing the request for updating OAuth access token based on the extracted content.

15. A computer program product for handling open authentication (OAuth) of an invoked web service in a process, the computer program product comprising:
    a non-transitory computer readable storage medium having program code embodied therewith, the program code executable by a processor for:
    determining whether an OAuth access token has expired, the determining comprising:
    sending a hypertext transfer protocol (HTTP) request to the invoked web service; and
    deciding whether the OAuth access token has expired based on a returned result from the invoked web service; and
    initiating an automatic update of the OAuth access token based on determining that the OAuth access token has expired, the initiating including extracting content from the returned result and constructing a request to update the OAuth access token, the extracted content including computer code executable for updating the OAuth access token, and the request to update the OAuth access token including the extracted content.

16. The computer program product according to claim 15, wherein sending a HTTP request to the invoked web service comprises:
    acquiring an address of an endpoint corresponding to the invoked web service;
    constructing an address of a description file of the invoked web service with the address of the endpoint; and
    sending the HTTP request to the address of the description file of the invoked web service.

17. The computer program product according to claim 16, wherein the address of the description file of the invoked web service is constructed by appending "?wsdl" to the address of the endpoint corresponding to the invoked web service.

* * * * *